(12) United States Patent
Hu

(10) Patent No.: US 10,981,577 B1
(45) Date of Patent: Apr. 20, 2021

(54) DIAGNOSING PERCEPTION SYSTEM BASED ON SCENE CONTINUITY

(71) Applicant: GM GLOBAL TECHNOLOGY OPERATIONS LLC, Detroit, MI (US)

(72) Inventor: Yao Hu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/720,096

(22) Filed: Dec. 19, 2019

(51) Int. Cl.
| | |
|---|---|
| B60Q 1/00 | (2006.01) |
| B60W 50/02 | (2012.01) |
| G06K 9/00 | (2006.01) |
| G06F 40/30 | (2020.01) |
| G06N 3/04 | (2006.01) |
| B60W 50/14 | (2020.01) |

(52) U.S. Cl.
CPC ........ *B60W 50/0205* (2013.01); *B60W 50/14* (2013.01); *G06F 40/30* (2020.01); *G06K 9/00805* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 2018/0150701 | A1* | 5/2018 | Kang | G06K 9/78 |
| 2018/0307748 | A1* | 10/2018 | Freilinger | G06F 16/337 |
| 2019/0042860 | A1* | 2/2019 | Lee | G06K 9/00798 |
| 2019/0064810 | A1 | 2/2019 | Jiang et al. | |
| 2019/0258878 | A1* | 8/2019 | Koivisto | G05D 1/00 |

OTHER PUBLICATIONS

U.S. Appl. No. 16/139,782, filed Sep. 24, 2018, Hu et al.
U.S. Appl. No. 16/527,561, filed Jul. 31, 2019, Hu et al.
U.S. Appl. No. 16/541,421, filed Aug. 15, 2019, Hu.
U.S. Appl. No. 16/661,126, filed Oct. 23, 2019, Hu et al.
U.S. Appl. No. 16/671,345, filed Nov. 1, 2019, Hu et al.

* cited by examiner

*Primary Examiner* — Julie B Lieu

(57) ABSTRACT

A perception module receives frames of data from sensors onboard a vehicle and identifies objects surrounding the vehicle based on the data. A fault detection module determines semantic information associated with the data, generates a score for each of the identified objects based on a correlation of each of the identified objects with the semantic information, and generates a score for the frames based on the scores for the identified objects. The fault detection module determines that the perception module: is operating normally in response to the score for the frames being less than a first threshold, has a fault in response to the score for the frames being greater than a second threshold, and needs inspection in response to the score being between the first and second thresholds.

20 Claims, 8 Drawing Sheets

Perception Results

| ID | Class | Bounding Box | | | |
|---|---|---|---|---|---|
| $i$ | $c_i^r$ | $x_{1,i}^r$ | $y_{1,i}^r$ | $x_{2,i}^r$ | $y_{2,i}^r$ |
| 1 | Car | 129 | 40 | 179 | 85 |

Ground Truth

| ID | Class | Bounding Box | | | |
|---|---|---|---|---|---|
| $j$ | $c_j^l$ | $x_{1,j}^l$ | $y_{1,j}^l$ | $x_{2,j}^l$ | $y_{2,j}^l$ |
| 1 | Car | 128 | 43 | 176 | 86 |

| Object ID | Class | Bounding Box | Probability Score | Scene Continuity Score |
|---|---|---|---|---|
| 1 | car | $x_{1,1}, y_{1,1}, x_{2,1}, y_{2,1}$ | 0.846 | 1 |
| 2 | boat | $x_{1,2}, y_{1,2}, x_{2,2}, y_{2,2}$ | 0.815 | 0 |
| 3 | car | $x_{1,3}, y_{1,3}, x_{2,3}, y_{2,3}$ | 0.975 | 1 |

US 10,981,577 B1

DIAGNOSING PERCEPTION SYSTEM BASED ON SCENE CONTINUITY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to perception systems used in autonomous vehicles and more particularly to systems and methods for diagnosing the perception systems based on scene continuity.

Perception systems used in autonomous vehicles utilize various sensors to sense surroundings of the vehicles. The perception systems receive data from these sensors regarding vehicle surroundings. For example, these sensors include cameras and other (e.g., radar, LIDAR, sonar, etc.) sensors situated at various locations within and outside the vehicles that provide the data to the perception systems. The perception systems process the data received from these sensors and determine the surroundings of the vehicles. For example, the surroundings may include other vehicles, pedestrians, road signs, traffic signs, buildings, landmarks, and so on. The autonomous vehicles' subsystems can control the vehicles based on these determinations. These determinations can also be used to inform and warn drivers of the conditions surrounding the vehicles.

SUMMARY

A system comprises a perception module and a fault detection module. The perception module is configured to receive one or more frames of data from sensors onboard a vehicle regarding surroundings of the vehicle and to identify objects surrounding the vehicle based on the data from the one or more frames. The fault detection module is configured to determine semantic information associated with the data from the one or more frames, to generate a score for each of the identified objects based on a correlation of each of the identified objects with the semantic information, and to generate a score for the one or more frames based on the scores for the identified objects. The fault detection module is configured to determine that the perception module is operating normally in response to the score for the one or more frames being less than a first threshold, that the perception module has a fault in response to the score for the one or more frames being greater than a second threshold, and that the perception module needs inspection in response to the score being between the first and second thresholds.

In other features, the fault detection module is configured to determine based on the scores for the identified objects whether the perception module has misidentified one of the objects. The misidentified object either does not exist in the one or more frames or is identified as a different object than an object present in the one or more frames.

In other features, the perception module comprises a first neural network and a first filter. The first neural network is configured to output proposals for identifying objects from the data from the one or more frames. Each of the proposals includes an object class, coordinates, and a probability. The first filter is configured to filter a subset of proposals from the proposals having overlapping coordinates and probabilities less than or equal to a third threshold, and to output the identified objects after filtering the subset of proposals from the proposals.

In other features, the fault detection module comprises a second neural network and a second filter. The second neural network is configured to receive the proposals and to assign the scores to the proposals based on a correlation of each of the proposals with the semantic information. The second filter is configured to filter from the proposals the subset of proposals having overlapping coordinates and probabilities less than or equal to the third threshold, and to output the identified objects with the scores after filtering the subset of proposals from the proposals.

In other features, the fault detection module comprises a first neural network and a second neural network. The first neural network is configured to extract features from the data from the one or more frames. The features represent the semantic information associated with the data from the one or more frames. The second neural network is configured to receive the identified objects and the features, and to output the scores for the identified objects.

In another feature, the second neural network is configured to receive the identified objects one at a time and to output the scores one at a time.

In another feature, the fault detection module is further configured to determine the score for the one or more frames based on a weighted average of the scores for the identified objects.

In another feature, the system further comprises a fault mitigation module configured to perform a mitigation procedure in response to the fault detection module determining that the perception module has a fault.

In another feature, the mitigation procedure includes alerting a driver of the vehicle and disengaging a self-driving feature.

In another feature, the system further comprises an activation module configured to activate or deactivate the fault detection module depending on the surroundings of the vehicle.

In still other features, a method comprises receiving one or more frames of data from sensors onboard a vehicle regarding surroundings of the vehicle. The method comprises identifying, using a perception module, objects surrounding the vehicle based on the data from the one or more frames. The method comprises determining semantic information associated with the data from the one or more frames. The method comprises generating a score for each of the identified objects based on a correlation of each of the identified objects with the semantic information. The method comprises generating a score for the one or more frames based on the scores for the identified objects. The method comprises determining that the perception module is operating normally in response to the score for the one or more frames being less than a first threshold, that the perception module has a fault in response to the score for the one or more frames being greater than a second threshold, and that the perception module needs inspection in response to the score being between the first and second thresholds.

In other features, the method further comprises determining based on the scores for the identified objects whether the perception module has misidentified one of the objects. The misidentified object either does not exist in the one or more frames or is identified as a different object than an object present in the one or more frames.

In other features, the method further comprises outputting proposals for identifying objects based on the data from the one or more frames. Each of the proposals includes an object class, coordinates, and a probability. The method further comprises filtering a subset of proposals from the proposals having overlapping coordinates and probabilities less than or equal to a third threshold. The method further comprises outputting the identified objects after filtering the subset of proposals from the proposals.

In other features, the method further comprises assigning the scores to the proposals based on a correlation of each of the proposals with the semantic information. The method further comprises filtering from the proposals the subset of proposals having overlapping coordinates and probabilities less than or equal to the third threshold. The method further comprises outputting the identified objects with the scores after filtering the subset of proposals from the proposals.

In other features, the method further comprises extracting features from the data from the one or more frames. The features represent the semantic information associated with the data from the one or more frames. The method further comprises outputting the scores for the identified objects based on the features and the identified objects.

In another feature, the method further comprises receiving the identified objects one at a time and outputting the scores one at a time.

In another feature, the method further comprises determining the score for the one or more frames based on a weighted average of the scores for the identified objects.

In another feature, the method further comprises performing a mitigation procedure in response to determining that the perception module has a fault.

In another feature, the mitigation procedure includes alerting a driver of the vehicle and disengaging a self-driving feature.

In another feature, the method further comprises activating or deactivating the fault detection module depending on the surroundings of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
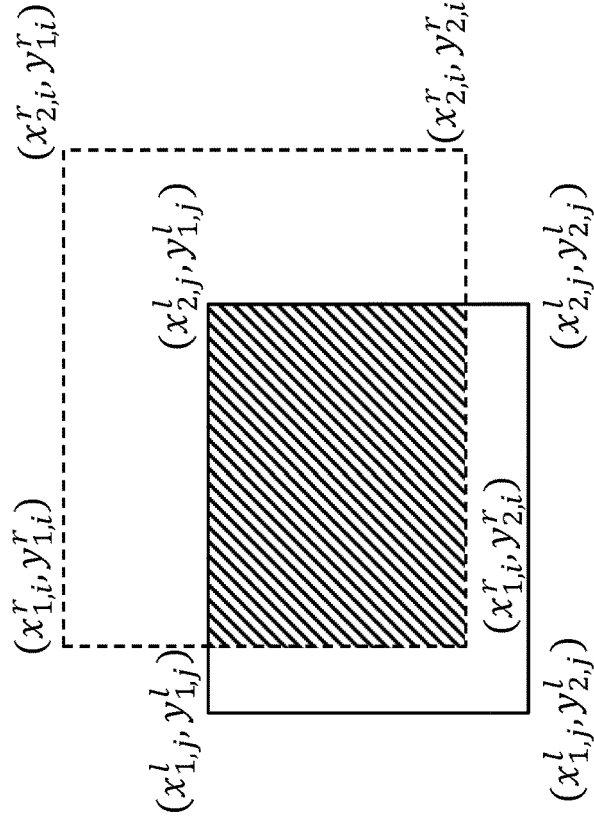
FIG. 1 shows a detection result, a ground truth result, a bounding box, and a table showing multiple detections results with their class, bonding box coordinates, and probabilities for objects detected by a perception system surrounding a vehicle.

Perception systems used to determine vehicle surroundings are subject to failures, which need to be detected. Online diagnostics of the perception systems can be challenging because when the vehicle is driven on the road, it is difficult to determine the ground truth in real time, where ground truth is reference information provided by direct observation (i.e., empirical evidence) as opposed to information provided by inference. The present disclosure provides systems and methods that diagnose the perception systems without ground truth. The systems and methods diagnose the perception systems by calculating scene continuities of perception results and determine faults based on discontinuities. The systems and methods can detect, identify, and mitigate faults in the perception system on the fly during runtime.

Scene continuity represents how much a perception result fits into (i.e., is consistent with other objects detected in) a current scene or image generated based on data captured by various sensors about surroundings of a vehicle. Scene continuity is calculated using specific models such as deep neural networks (used throughout the disclosure for example only) as explained below in detail. The calculated scene continuity is compared to a threshold to detect an error. Fault mitigation can be performed based on the detected error. For example, the systems and methods can disengage the self-driving feature, send alerts to the driver, smoothly pullover, and/or ignore a faulty perception channel in fusion (i.e., isolate and disregard a faulty channel when channel redundancy is available). The systems and methods improve user experience by providing fault alerts and optimizing fleet management. The systems and methods improve reliability of the perception systems and enhance perceived quality of vehicles without additional hardware.

More specifically, scene continuity is determined based on semantic information of an image or raw data captured by sensors onboard a vehicle. The perception results generated based on the raw data provide information about the objects detected in a frame or an image. Scene continuity represents correlation between the objects identified in the frame or a small batch of frames. Note that the correlation is not between frames in a time sequence, and therefore the continuity is not temporal continuity. Instead, the correlation is of an object with other objects in one or more frames. Accordingly, scene continuity represents correlation between different objects in one or more frames. This object correlation or scene continuity in one or more frames can be used to isolate a fault in the perception system as explained below.

For example, the perception system may identify N objects in a frame or an image as the vehicle is being driven on a roadway, where N is an integer greater than 1. The perception system may incorrectly identify one of the N objects. For example, the incorrectly identified object may in fact be non-existent (e.g., a pedestrian or a bicycle in a freeway lane). As another example, an object actually present may be misidentified as another object (e.g., a motorcycle may be identified as a car). The goal of the fault detection system of the present disclosure is to identify such faulty or anomalous object detection by the perception system.

For each object detected in a frame by the perception system, the fault detection system receives object information from the perception system such as object ID (e.g., a number assigned to the object in the frame), object class (e.g., car, truck, boat, etc.), bounding box data (explained below), and a probability score (also explained below). The fault detection system calculates a continuity score for each object based on the semantic information of the objects in the frame.

For example, in a particular frame when the vehicle is being driven on a city street, the fault detection system can assign a scene continuity score of 1 to most cars identified in the frame since the cars "fit" the scene in the frame based on the semantic information of the detected objects in the frame, most of which may be cars. However, the perception system may also identify a boat in the frame, which is unexpectedly detected on the city street in the frame and is also assigned a high probability score by the perception module. The fault detection system can assign a scene continuity score of 0 to the boat since the boat does not "fit" the scene in the frame based on the semantic information of the detected objects in the frame, most of which are cars. Thus, the fault detection system can identify a failure of the perception system, which in this example is the incorrect identification of the boat in the frame when in fact the boat is non-existent. Similar methodology can be used to detect a fault where the perception system incorrectly identifies an object that in fact exists in the frame (e.g., when the perception system misidentifies a bicycle as a motorbike, and so on).

In a perception system, when a sensor onboard a vehicle captures data from an object around the vehicle, the raw data from the sensor is sent to the perception system for processing. For example, the perception system may be implemented using a deep neural network (DNN). For a given image generated from the raw data, the neural network outputs the information for each object detected in the image, including class, bounding box, and probability. The perception system provides a representation of the object in a bounded box with positional coordinates of the object indicating the position of the object at the time of sensing the object. The perception system further classifies the object (e.g., provides an indication about the type or class of the object, whether the object is a vehicle, a traffic sign, a landmark, a pedestrian, and so on). The perception system then assigns a probability to a detected object. The probability indicates a level of confidence with which the perception system (e.g., the DNN) detects the object. For example, if a car is a little vague in the image, but is still captured by the neural network, it may have a low probability. Conversely, if a car is clear in the image, it may have a high probability.

FIG. 1 shows examples of a detection result or a perception result when the detected object is a car. FIG. 1 also shows the ground truth for the detected object (a car in this example). FIG. 1 further shows an example of a bounding box for the detected object. Accordingly, a perception system can output a plurality of detection results as shown in the table in FIG. 1, where the table includes for each identified object, an ID, a class, bounding box coordinates, and a probability score. The present disclosure adds the scene continuity score, which is generated described below in detail.

The present disclosure provides two implementations of a fault detection system for detecting faults in a perception system of a vehicle. In a first implementation, the fault detection system determines scene continuities for a white box perception module; that is, when the perception system and its operations are known or knowable, and the fault detection system can therefore access the elements or components of the perception system. In a second implementation, the fault detection system determines the scene continuities for a black box perception system; that is, when the perception system and its operations are unknown or unknowable, and the fault detection system therefore cannot access the elements or components of the perception system.

Figure 2:
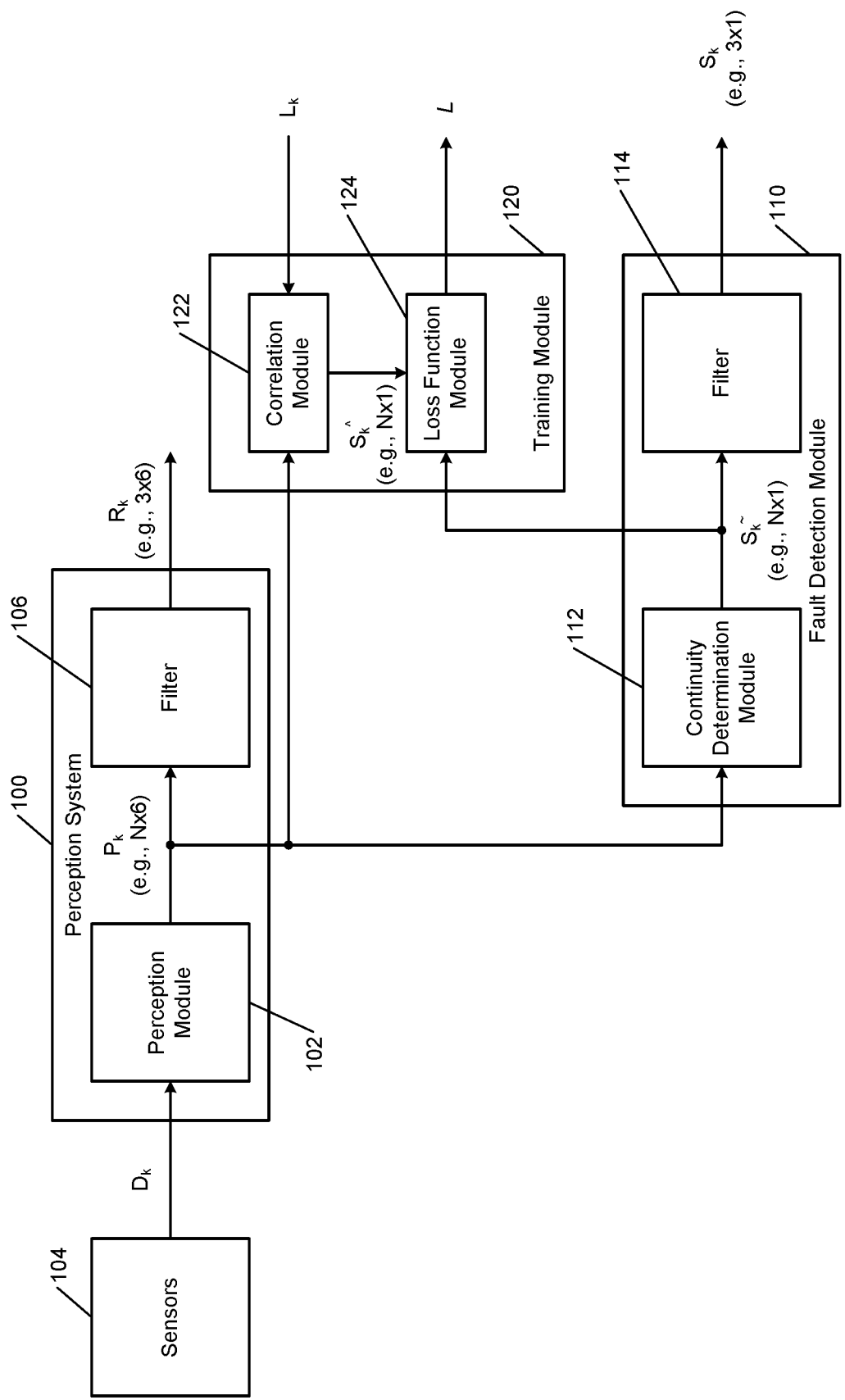
FIG. 2 shows a first system for detecting a fault in a perception system.

FIG. 2 shows the first implementation, where a perception system 100 is a white box. The perception system 100 comprises a perception module 102 that receives a frame or a batch of frames of data $D_k$ from sensors 104 onboard a vehicle. For example, the batch of frames may include one or multiple images. The frames in a batch may preferably be continuous (i.e., consecutive) but need not be continuous. The perception module 102, using a trained model, such as a deep neural network (DNN), generates proposals $P_k$, which are possible candidates for the objects in the received frame(s). An object that has moved from one frame to another may have two proposals: one when detected in a first frame and another when detected in a next frame. The perception system 100 comprises a filter 106 that filters the proposals and generates detection results $R_k$ indicating objects identified in the received frames.

Depending on the model used by the perception module 102, the proposals can be in the form of a matrix of a fixed size such as N×6, for example, where N denotes the number of proposals or candidates, which constitute rows of the matrix; and the number 6 denotes, as an example, the type of information for each candidate (e.g., class (1 column), bounding box coordinates (4 columns), and probability score (1 column)). The number N can be relatively high (e.g., in hundreds). For example, see the table shown in FIG. 1. The number of proposals for a given perception module can be fixed regardless of whether a single frame or a batch of frames is input to the perception module. A scene in this example is a collection of the N proposals.

The perception module 102 assigns each of the candidates a probability score indicating a likelihood of being correctly detected as an object in the received frames. Many of these N candidates may have a relatively low probability score, however, and may need to be filtered out. For example, many of these N candidates may have relatively low probability scores because these candidates may include objects such as traffic signs, trees, and candidates that are small, far, vague, and/or with overlapping bounding boxes, and therefore unidentifiable or invalid.

The filter 106 filters the proposals to remove these candidates with relatively low probability scores and generates detection results $R_k$ indicating objects identified in the received frames with relatively high probability scores. The filter 106 also filters the proposals which have high overlapping coordinates. For example, the detection results can be in the form of a matrix such as M×6, where M is a relatively small integer compared to N (e.g., approximately less than 10).

A fault detection system, also called a fault detection module, 110 comprises a continuity determination module 112, which includes a second DNN trained to generate scene continuity scores for the proposals $P_k$ generated by the perception module 102. Since the perception module 102 is a white box, the format (e.g., the size of the matrix) of the proposals $P_k$ can be known. Accordingly, the second DNN (i.e., the continuity determination module 112) receives the proposals $P_k$ generated by the perception module 102 and assigns scene continuity scores to the proposals $P_k$. For example, the output of the second DNN (i.e., the continuity determination module 112) is in the form of a matrix Sc of size N×1, where the one column includes a scene continuity score for each of the N candidates or proposals $P_k$.

The fault detection module 110 comprises a filter 114, which is similar to the filter 106 of the perception system 100, that filters the output of the second DNN (i.e., the continuity determination module 112) using the same filter as that used by the perception system 100. Again, it is possible to use the same filter because the perception module 102 is a while box, and therefore the filter 106 is known or knowable. The output of the filter 114 is in the form of a matrix $S_k$ of size M×1, where M denotes the same objects identified by the perception module 102 in the output of its filter 106 (i.e., in the detection results $R_k$). The one column in the output of the filter 114 includes a scene continuity score for each of the M objects identified by the perception module 102 in the output of its filter 106 (i.e., in the detection results $R_k$).

If one of the M objects has a relatively low scene continuity score, the fault detection module 110 can determine that that object is incorrectly identified by the perception module 102 in the detection results $R_k$. This way, an error in the perception module 102 can be detected by the fault detection module 110.

A training module 120 is used to train the second DNN as follows at the factory before deploying the fault detection module 110 in vehicles to detect errors in the perception module 102 during runtime (i.e., on the fly when the vehicle with the perception module 102 is being driven on roadways). The training module 120 is not used during the runtime. The training module 120 includes a correlation module 122 that receives the N proposals $P_k$ generated by the DNN of the perception module 102 for a batch of frames. $P_k$ can be altered to add correct or incorrect detections to augment the training dataset. Ground truth (i.e., labeled) data Lk about the actual, known objects in the frames is input to the correlation module 122. The correlation module 122 correlates each proposal $P_k$ to the ground truth data Lk. The correlation module 122 assigns a ground truth continuity score to each of the proposals $P_k$. The score is a 1 if the object in the proposal is consistent (or semantically matches) with the objects in the ground truth data and a 0 if the object in the proposal is inconsistent (or semantically does not match) with the objects in the ground truth data. The score is zero whether the inconsistent object is identified without actually existing (e.g., a nonexistent boat) or is existing but is misidentified (e.g., a motorcycle identified as a car). The score can be any number between 0 and 1. Thus, the correlation module 122 generates a matrix $\hat{S_k}$ of the N proposals and their ground truth continuity scores. The matrix $\hat{S_k}$ is of the size N×1.

During training, the same proposals that are input to the correlation module 122 are also input to the second DNN (i.e., the continuity determination module 112) of the fault detection module 110. The second DNN (i.e., the continuity determination module 112) also generates a continuity score matrix $\tilde{S_k}$ of the size N×1 as described above. The training module 120 includes a loss function module 124 that calculates a loss function of the two matrices $\hat{S_k}$ and $\tilde{S_k}$ using an L2 norm, which involves determining errors based on element-wise comparisons between the two matrices $\hat{S_k}$ and $\tilde{S_k}$ and then aggregating the errors.

$$\mathcal{L} = \text{mean}(\|\hat{S_k} - \tilde{S_k}\|_2^2)$$

In the above equation, subscript 2 denotes the L2 norm, and the superscript 2 indicates the element-wise square error obtained using the L2 norm. The loss function is zero if the two matrices are identical. If the loss function is nonzero, the second DNN is trained recursively until the loss function is minimized.

Figure 3:
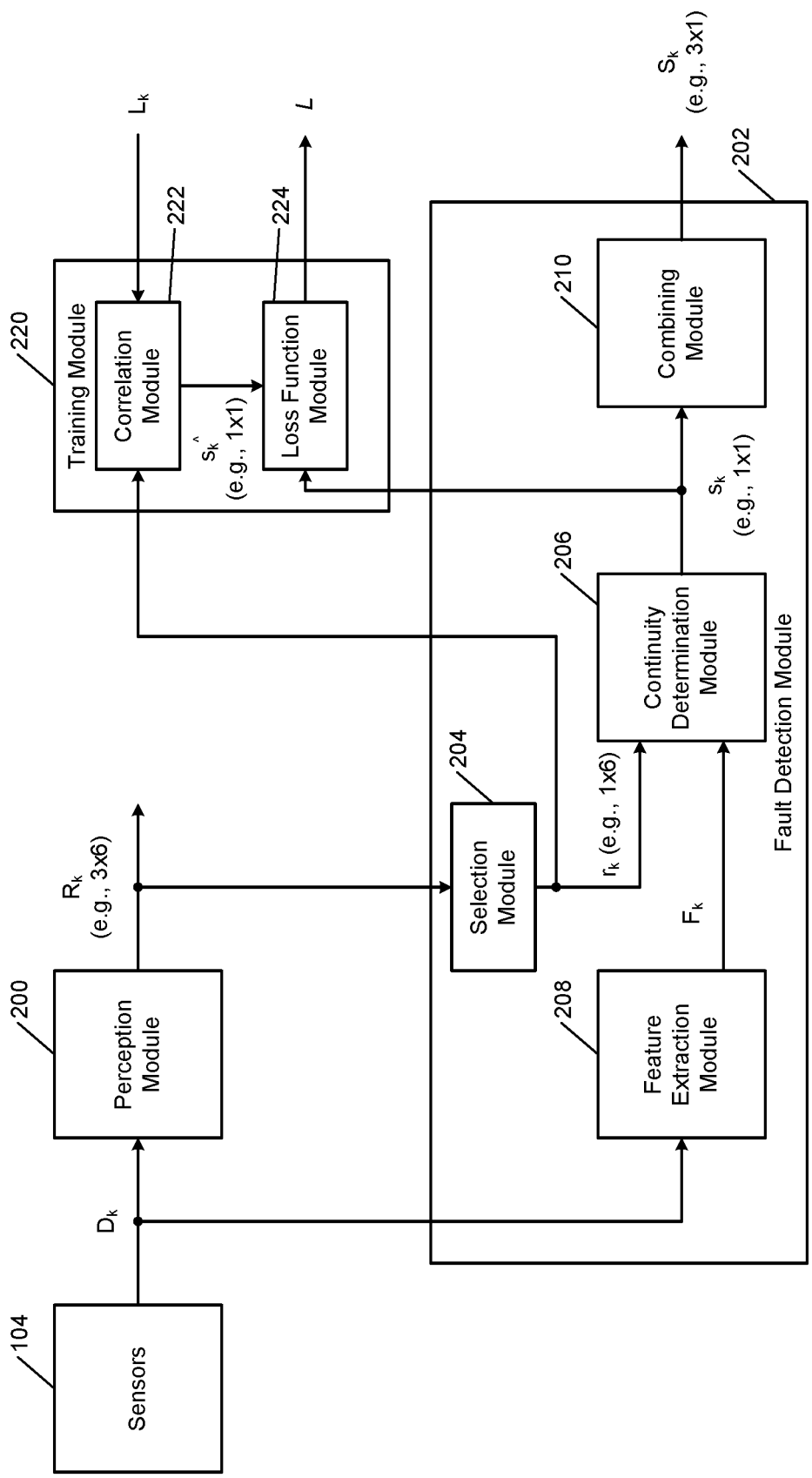
FIG. 3 shows a second system for detecting a fault in a perception system.

FIG. 3 shows the second implementation, where a perception module 200 is a black box. Accordingly, only the final detection results $R_k$ generated by the perception module 200 are available. Again, a single frame or a batch of frames (continuous or not continuous) is input to the perception module 200. A scene is a collection of the detection results $R_k$ generated by the perception module 200. In the detection results $R_k$, the number M of the identified objects can be vary when the data $D_k$ in each set of frames varies.

In the second implementation, at any given time, the perception module 200 outputs M detection results, M being any non-negative integer. If M equals to zero, the fault detection process may be skipped, since there is no detection results to be diagnosed. A fault detection system, also called a fault detection module, 202 includes a selection module 204 that selects the M detection results one at a time, and the remainder of the fault detection module 202 performs the processing described below iteratively by selecting each of the M detection results in turn. Thus, the output $r_k$ of the selection module 204 is a matrix of the fixed size 1×6, for example, where the one row denotes the single object or detection result selected from the M detection results. The output $r_k$ of the selection module 204 is input to a continuity determination module 206, which includes a first DNN to determine scene continuity scores as described below.

The fault detection module 202 further comprises a feature extraction module 208, which includes an additional second DNN that extracts features $F_k$ from the raw data $D_k$ of the received frames. The features $F_k$ represent the semantic information of the whole image associated with the received frames. The first DNN (i.e., the continuity determination module 206) compares the selected object or detection result $r_k$ with the features $F_k$ representing the semantic information of the whole image and assigns a scene continuity score $s_k$ to the object $r_k$. The scene continuity score $s_k$ for the object $r_k$ is a matrix of the size 1×1, where the one column denotes the scene continuity score $s_k$ for the object $r_k$.

The above process of generating the scene continuity score is repeated for the next object $r_k$ until scene continuity scores $s_k$ are generated for all M objects. Note that the feature information $F_k$ remains the same during the scene continuity score generation for all M objects. The fault detection module further comprises a combining module 210 that combines and outputs the scene continuity scores $s_k$ of all M objects into a scene continuity score $S_k$, which is in the form of a matrix $S_k$ of the size M×1.

A training module 220 is used to train the first DNN as follows at the factory before deploying the fault detection module 202 in vehicles to detect errors in the perception module 200 during runtime (i.e., on the fly when the vehicle with the perception module 200 is being driven on roadways). The training module 220 is not used during the runtime. The training module 220 includes a correlation module 222 that receives the selected object or detection result $r_k$ for a batch of frames. $r_k$ can be altered to add correct or incorrect detections to augment the training dataset. The ground truth (i.e., labeled) data Lk about the actual, known objects in the frames is input to the correlation module 222. The correlation module 222 correlates the selected object $r_k$ to the ground truth data Lk. The correlation module 222 assigns a ground truth continuity score to the selected object $r_k$. The score is a 1 if the object in the selected object $r_k$ is consistent (or semantically matches) with the objects in the ground truth data and a 0 if the object in the selected object $r_k$ is inconsistent (or semantically does not match) with the objects in the ground truth data. The score can be any number between 0 and 1. Thus, the correlation module 222 generates a matrix $\hat{s}_k$ of the selected object $r_k$ and its ground truth continuity score. The matrix $\hat{s}_k$ is of the size 1×1.

During training, the same selected object $r_k$ that is input to the correlation module 222 is also input to the first DNN (i.e., the continuity determination module 206). The first DNN (i.e., the continuity determination module 206) also generates a continuity score matrix $s_k$ of the size 1×1 as described above. The training module 220 includes a loss function module 224 that calculates a loss function of the two matrices $\hat{s}_k$ and $s_k$ using an L2 norm, which involves determining errors based on element-wise comparisons between two matrices $\hat{s}_k$ and $s_k$ and then aggregating the errors.

$$\mathcal{L} = \mathrm{mean}(\|\hat{s}_k - s_k\|_2^2)$$

Again, in the above equation, subscript 2 denotes the L2 norm, and the superscript 2 indicates the element-wise square error obtained using the L2 norm. The loss function is zero if the two matrices are identical. If the loss function is nonzero, the first DNN is trained recursively until the loss function is minimized. The above training process is repeated for each selected object $r_k$ until the training is completed for all M detected objects.

Note that in either implementation, a scene continuity score is not a binary value of 0 or 1. Rather, a scene continuity score is any value between 0 and 1; that is, greater than or equal to 0 and less than or equal to 1. While this information may be useful in distinguishing between whether a perception system has identified a nonexistent object or has incorrectly identified an existing object, the fault detection system detects whether the scene continuity score is closer to 0 or closer 1, based on which the fault detection system detects a fault in the perception system.

Also note that in the first implementation, the known perception module can also be considered (i.e., treated) as a black box as explained in the second implementation. Accordingly, the second implementation can be used with a known perception module as well.

Figure 4:
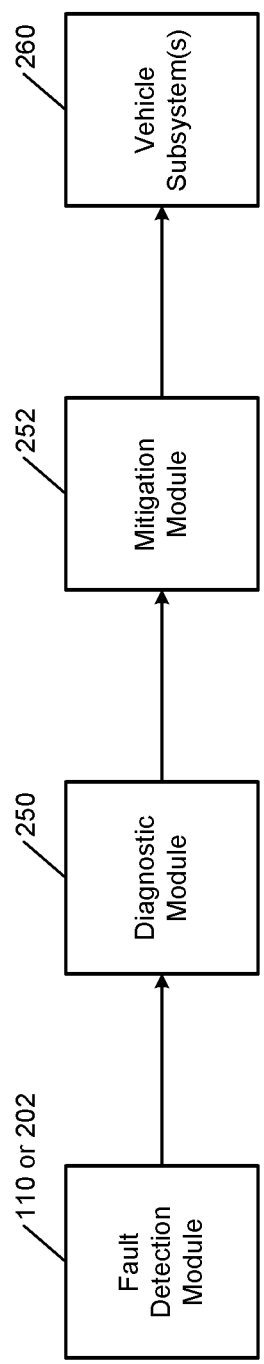
FIG. 4 shows an example of a fault mitigation system to mitigate a fault detected by the first or second system.

FIG. 4 shows a diagnostic module 250 and a mitigation module 252, which can be used in conjunction with or can be integrated with the fault detection modules 110 or 202 of either implementation. That is, these modules are part of the fault detection systems shown in FIGS. 2 and 3. Once the fault detection modules 110, 202 detect a likelihood of a fault condition or an anomalous object detection by the perception system 100 or 200 based on the scene continuity scores, the diagnostic module 250 analyses the scene continuity scores of the detected objects as follows. Based on the analyses, the diagnostic module 250 diagnoses if the perception system 100 or 200 is faulty, if the perception system 100 or 200 is operating normally (i.e., without fault), or if perception system 100 or 200 needs inspection.

The diagnostic module 250 divides the scene continuity scores $s_k$ for all the objects identified by the perception module (white box or black box) in a set of scene continuity scores $S_k$ into three groups: groups having low, medium, or high scene continuity scores. For example, the diagnostic module 250 groups scene continuity scores ski that are less than a first threshold $\theta_1$ into a first set $\{s_k^l\}$; the diagnostic module 250 groups scene continuity scores $s_k^m$ that are greater than or equal to the first threshold $\theta_1$ but that are less than or equal to a second threshold $\theta_2$ into a second set $\{s_k^m\}$; and the diagnostic module 250 groups scene continuity scores $s_k^h$ that are greater than the second threshold $\theta_2$ into a third set $\{s_k^h\}$.

Then the diagnostic module 250 calculates a scene discontinuity score for the whole frame or for the whole batch of frames using weights using the following equation. The weights in the following equation can be 1 or can be adjusted (e.g., calibrated) to emphasize one or more groups to improve the fault identification.

$$\overline{S}_k = w_l \cdot \mathrm{mean}\{1 - s_k^l\} + w_m \cdot \mathrm{mean}\{1 - s_k^m\} + w_h \cdot \mathrm{mean}\{1 - s_k^h\}$$

The diagnostic module 250 detects a fault in the perception system if the scene discontinuity score is greater than a third threshold 83. The diagnostic module 250 determines that the perception system is operating normally (i.e., without any fault) if the scene discontinuity score is less than a fourth threshold $\theta_4$. The diagnostic module 250 determines that the perception system is suspicious and recommends inspection of the perception system if the scene discontinuity score is between the third and fourth thresholds; that is, if the scene discontinuity score is greater than or equal to the fourth threshold $\theta_4$ but less than or equal to the third threshold $\theta_3$.

The mitigation module 252 mitigates a fault when the fault detection system (e.g., the diagnostic module 250) detects a fault in the perception system. Non-limiting examples of mitigation procedures performed by the mitigation module 252 include the following. For example, if the fault detection system indicates a sensor failure (e.g., one of the cameras is not working properly), the mitigation procedure can include disregarding that sensor and using another sensor (e.g., another camera) instead. For example, if the fault detection system indicates a fault in the perception system (i.e., if perception system results are incorrect), the mitigation procedure can include alerting the passenger to immediately take control of the vehicle and disengage self-driving feature. For example, such an alert message can be output audio-visually via an infotainment subsystem of the vehicle. Depending on the severity of the fault, the mitigation procedure can also include pulling over the vehicle to the roadside (e.g., using an autonomous subsystem of the vehicle). Additional examples of mitigation procedures are contemplated.

The fault detection system (e.g., the mitigation module 252) may communicate with various subsystems 260 of the vehicle. For example, the subsystems 260 can include but are not limited to an infotainment subsystem (e.g., to provide alerts), an autonomous or self-driving subsystem (e.g., to control the vehicle, mitigate faults, etc.), a braking subsystem, a speed control subsystem, a navigation subsystem, a communication subsystem (e.g., to communicate with a cloud-based back end system shown in FIGS. 7A and 7B), etc.

The fault detection system can be triggered based on many different conditions. Non-limiting examples of such conditions include the following. For example, the fault detection can be performed periodically (e.g., every N minutes, after every ignition, after X minutes after every ignition, after Y minutes after the vehicle begins to move after coming to a stop such as at a traffic light or sign, and so on). For example, the fault detection can be triggered every time the vehicle approaches or passes through a particular intersection or a location (e.g., in a downtown area), where there may be a chance of a perception error. For example, the fault detection can be triggered more infrequently on highways that in cities.

Users may trigger (i.e., turn on) the fault detection based on their preferences. A fleet manager may trigger the fault detection depending on situations where the vehicles in a fleet are being driven. For example, the fault detection system in a taxi may be triggered less when the taxi is driving from an airport to a park and ride lot next to a freeway than when the taxi is driving from an airport to a city. Alternatively, the fault detection can be performed continuously without regard to any triggering conditions. Other examples of additional factors or considerations (bases) that can trigger the fault detection are contemplated.

Figure 5:
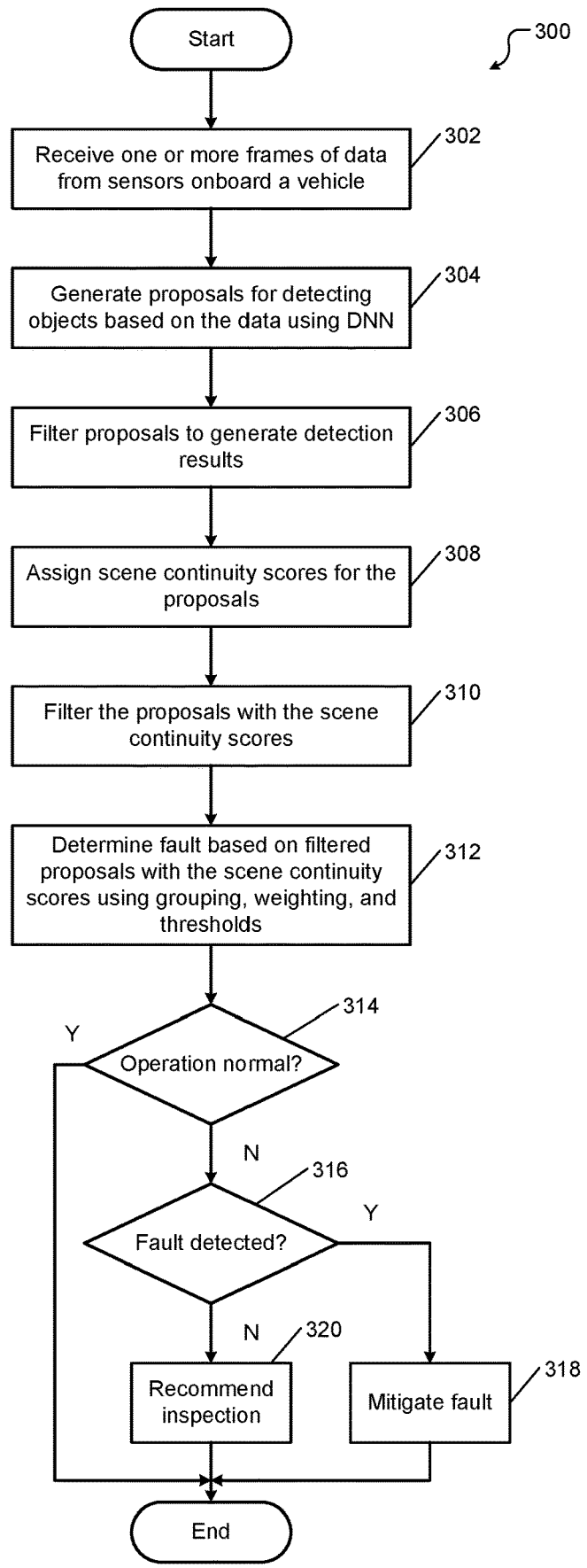
FIG. 5 shows a first method for detecting a fault in a perception system.

FIG. 5 shows a first method 300 for fault detection according to the present disclosure. For example, one or more elements shown in FIGS. 2 and 4 can implement one or more steps of the first method 300. At 302, control receives one or more frames of data from sensors onboard her vehicle. At 304, control generates proposals for detecting objects based on the data using a model such as a deep neural network. At 306, control filters the proposals to generate detection results for objects detected based on the data.

At 308, control of assigns scene continuity scores for the proposals. At 310, control filters the proposals with the scene continuity scores as described with reference to FIG. 2 above. At 312, control determines if one of the detection results is faulty based on the filtered proposals with the scene continuity scores using grouping, weighting, and thresholds as described with reference to FIG. 4 above.

At 314, based on the analysis performed at 312, control determines if the perception system is operating normally (i.e., without any fault). The method ends if the perception system is operating normally. If, however, the perception system is not operating normally, at 316, control determines if a fault is detected in the perception system based on the analysis performed at 312. At 318, if a fault is detected in the perception system, control mitigates the fault as described above. If, however, a fault is not detected but the perception system is also not operating normally (as would be indicated by comparisons with various thresholds during the analysis described above), control recommends an inspection of the perception system at 320.

Figure 6:
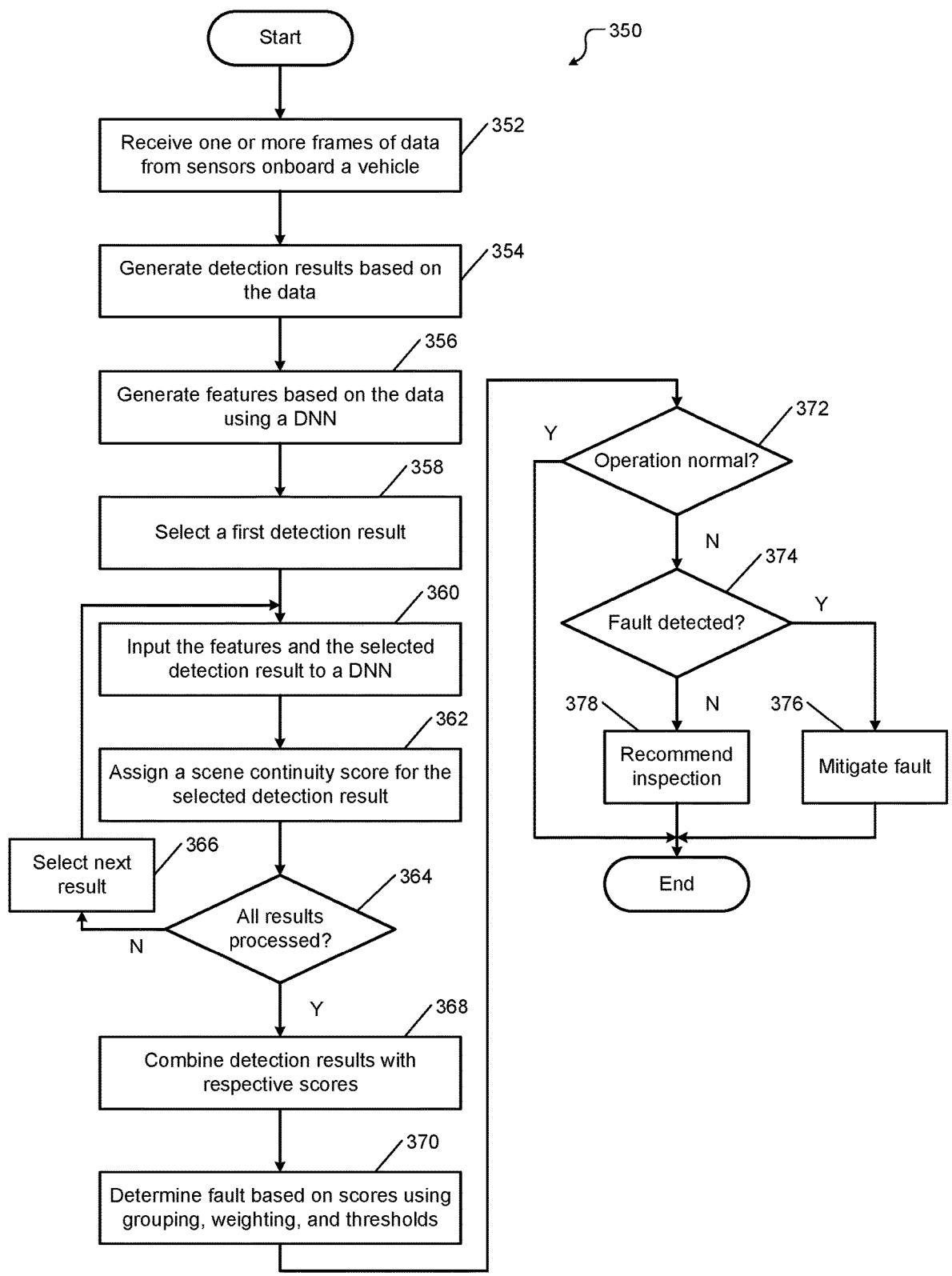
FIG. 6 shows a second method for detecting a fault in a perception system.

FIG. 6 shows a second method 350 for fault detection according to the present disclosure. For example, one or more elements shown in FIGS. 3 and 4 can implement one or more steps of the first method 350. At 352, control receives one or more frames of data from sensors onboard her vehicle. At 354, control generates detection results for objects detected based on the data. At 356, control generates features based on the data using a model such as a deep neural network.

At 358, control selects a first detection result. At 360, control inputs the features and the selected detection result to a second deep neural network. At 362, control of assigns a scene continuity score to the selected detection result based on the features using the second deep neural network. At 364, control determines if all the detection results are processed. If all the detection results are not processed, at 366, control selects the next detection result and proceed to 360. At 368, after all the detection results are processed, control combines the detection results with their respective scene continuity scores as described with reference to FIG. 3 above.

At 370, control determines if one of the detection results is faulty based on the detection results with the scene continuity scores using grouping, weighting, and thresholds as described with reference to FIG. 4 above. At 372, based on the analysis performed at 370, control determines if the perception system is operating normally (i.e., without any fault). The method ends if the perception system is operating normally. If, however, the perception system is not operating normally, at 374, control determines if a fault is detected in the perception system based on the analysis performed at 370. At 376, if a fault is detected in the perception system, control mitigates the fault as described above. If, however, a fault is not detected but the perception system is also not operating normally (as would be indicated by comparisons with various thresholds during the analysis described above), control recommends an inspection of the perception system at 378.

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 7A:
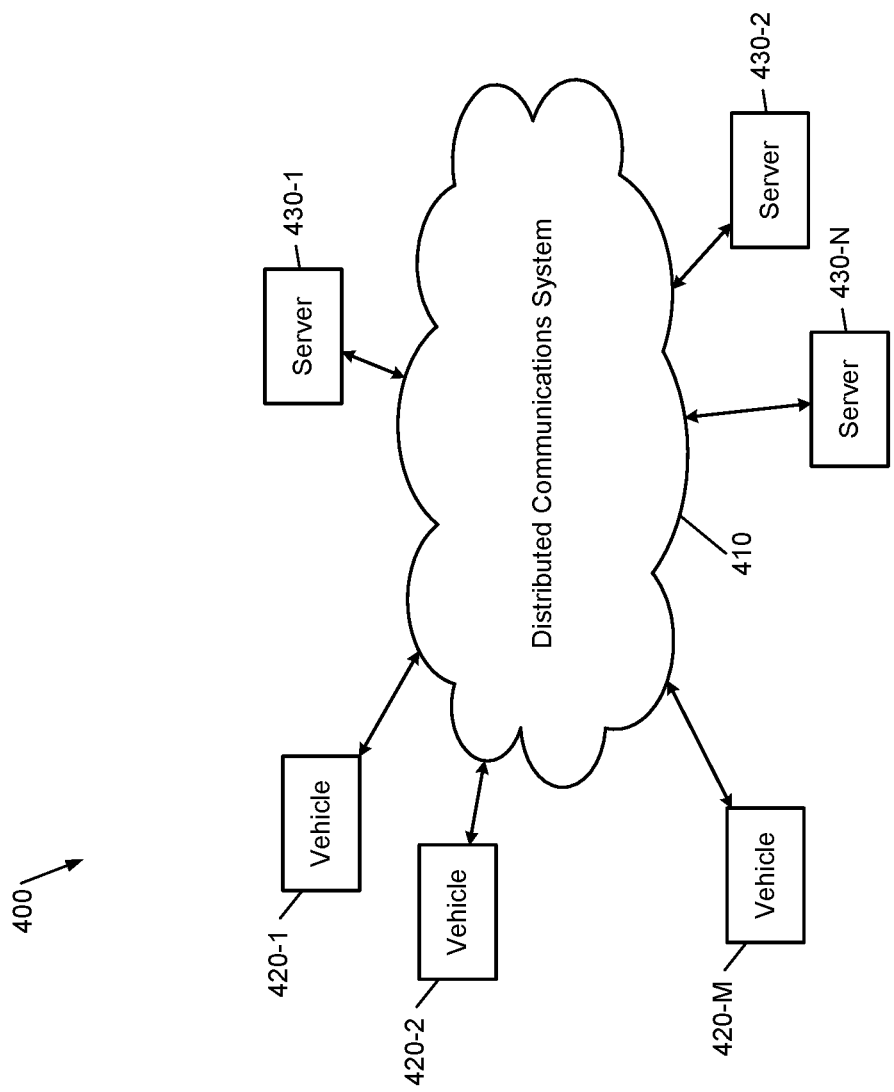
FIG. 7A shows a simplified example of a distributed computing system that can implement the systems and methods shown in FIGS. 1-6.

FIG. 7A shows a simplified example of a distributed computing system 400. The distributed computing system 400 includes a distributed communications system 410, one or more vehicles 420-1, 420-2, . . . , and 420-M (collectively, vehicles 420), and one or more servers 430-1, 430-2, . . . , and 430-N (collectively, servers 430). M and N are integers greater than or equal to one.

The distributed communications system 410 may include a local area network (LAN), a wide area network (WAN) such as the Internet, or other type of network. The vehicles 420 and the servers 430 may be located at different geographical locations and may communicate with each other via the distributed communications system 410. For examples the servers 430 may be located in a data center in a cloud. The vehicles 420 and the servers 430 may connect to the distributed communications system 410 using wireless and/or wired connections.

The vehicles 420 may include systems shown and described above with reference to FIGS. 1-6 that may execute software applications such as the various methods described above with reference to FIGS. 1-6. The servers 430 may provide multiple services to the client devices 420. For example, the servers 430 may execute software applications developed by one or more vendors (e.g., a backend system for detecting and mitigating faults). The servers 430 may host multiple databases that are relied on by the software applications in providing services to users of the vehicles 420.

Figure 7B:
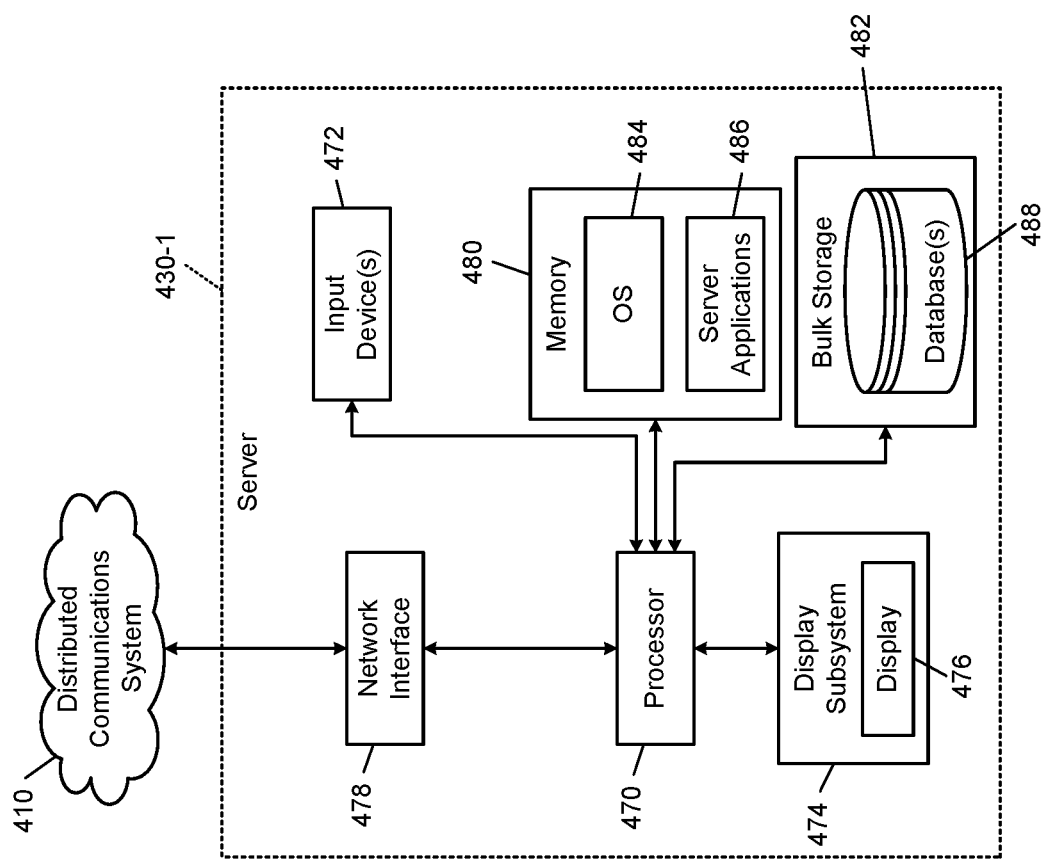
FIG. 7B shows a simplified example of a server of the distributed computing system of FIG. 7A.

FIG. 7B shows a simplified example of the server 430-1. The server 430-1 typically includes one or more CPUs or processors 470, a network interface 478, memory 480, and bulk storage 482. In some implementations, the server 430-1 may be a general-purpose server and include one or more input devices 472 (e.g., a keypad, touchpad, mouse, and so on) and a display subsystem 474 including a display 476.

The network interface 478 connects the server 430-1 to the distributed communications system 410. For example, the network interface 478 may include a wired interface (e.g., an Ethernet interface) and/or a wireless interface (e.g., a Wi-Fi, Bluetooth, near field communication (NFC), or other wireless interface). The memory 480 may include volatile or nonvolatile memory, cache, or other type of memory. The bulk storage 482 may include flash memory, one or more magnetic hard disk drives (HDDs), or other bulk storage devices.

The processor 470 of the server 430-1 executes an operating system (OS) 484 and one or more server applications 486 (e.g., a backend system for detecting and mitigating faults and/or for further analyzing minor or non-critical faults), which may be housed in a virtual machine hypervisor or containerized architecture. The bulk storage 482 may store one or more databases 488 that store data structures used by the server applications 486 to perform respective functions.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a perception module configured to receive one or more frames of data from sensors onboard a vehicle regarding surroundings of the vehicle and to identify objects surrounding the vehicle based on the data from the one or more frames; and
a fault detection module configured to:
determine semantic information associated with the data from the one or more frames;
generate a score for each of the identified objects based on a correlation of each of the identified objects with the semantic information;
generate a score for the one or more frames based on the scores for the identified objects; and
determine that:
the perception module is operating normally in response to the score for the one or more frames being less than a first threshold;
the perception module has a fault in response to the score for the one or more frames being greater than a second threshold; and
the perception module needs inspection in response to the score being between the first and second thresholds.

2. The system of claim 1 wherein the fault detection module is configured to determine based on the scores for the identified objects whether the perception module has misidentified one of the objects, wherein the misidentified object either does not exist in the one or more frames or is identified as a different object than an object present in the one or more frames.

3. The system of claim 1 wherein the perception module comprises:
a first neural network configured to output proposals for identifying objects from the data from the one or more frames, wherein each of the proposals includes an object class, coordinates, and a probability; and
a first filter configured to filter a subset of proposals from the proposals having overlapping coordinates and probabilities less than or equal to a third threshold, and to output the identified objects after filtering the subset of proposals from the proposals.

4. The system of claim 3 wherein the fault detection module comprises:
a second neural network configured to receive the proposals and to assign the scores to the proposals based on a correlation of each of the proposals with the semantic information; and
a second filter configured to filter from the proposals the subset of proposals having overlapping coordinates and probabilities less than or equal to the third threshold, and to output the identified objects with the scores after filtering the subset of proposals from the proposals.

5. The system of claim 1 wherein the fault detection module comprises:
a first neural network configured to extract features from the data from the one or more frames, wherein the features represent the semantic information associated with the data from the one or more frames; and
a second neural network configured to receive the identified objects and the features, and to output the scores for the identified objects.

6. The system of claim 5 wherein the second neural network is configured to receive the identified objects one at a time and to output the scores one at a time.

7. The system of claim 1 wherein the fault detection module is further configured to determine the score for the one or more frames based on a weighted average of the scores for the identified objects.

8. The system of claim 1 further comprising a fault mitigation module configured to perform a mitigation procedure in response to the fault detection module determining that the perception module has a fault.

9. The system of claim 8 wherein the mitigation procedure includes alerting a driver of the vehicle and disengaging a self-driving feature.

10. The system of claim 1 further comprising an activation module configured to activate or deactivate the fault detection module depending on the surroundings of the vehicle.

11. A method comprising:
receiving one or more frames of data from sensors onboard a vehicle regarding surroundings of the vehicle;
identifying, using a perception module, objects surrounding the vehicle based on the data from the one or more frames;
determining semantic information associated with the data from the one or more frames;
generating a score for each of the identified objects based on a correlation of each of the identified objects with the semantic information;
generating a score for the one or more frames based on the scores for the identified objects; and
determining that:
the perception module is operating normally in response to the score for the one or more frames being less than a first threshold;
the perception module has a fault in response to the score for the one or more frames being greater than a second threshold; and
the perception module needs inspection in response to the score being between the first and second thresholds.

12. The method of claim 11 further comprising determining based on the scores for the identified objects whether the perception module has misidentified one of the objects, wherein the misidentified object either does not exist in the one or more frames or is identified as a different object than an object present in the one or more frames.

13. The method of claim 11 further comprising:
outputting proposals for identifying objects based on the data from the one or more frames, wherein each of the proposals includes an object class, coordinates, and a probability;

filtering a subset of proposals from the proposals having overlapping coordinates and probabilities less than or equal to a third threshold; and outputting the identified objects after filtering the subset of proposals from the proposals.

14. The method of claim 13 further comprising:

assigning the scores to the proposals based on a correlation of each of the proposals with the semantic information;

filtering from the proposals the subset of proposals having overlapping coordinates and probabilities less than or equal to the third threshold; and outputting the identified objects with the scores after filtering the subset of proposals from the proposals.

15. The method of claim 11 further comprising:

extracting features from the data from the one or more frames, wherein the features represent the semantic information associated with the data from the one or more frames; and outputting the scores for the identified objects based on the features and the identified objects.

16. The method of claim 15 further comprising receiving the identified objects one at a time and outputting the scores one at a time.

17. The method of claim 11 further comprising determining the score for the one or more frames based on a weighted average of the scores for the identified objects.

18. The method of claim 11 further comprising performing a mitigation procedure in response to determining that the perception module has a fault.

19. The method of claim 18 wherein the mitigation procedure includes alerting a driver of the vehicle and disengaging a self-driving feature.

20. The method of claim 11 further comprising activating or deactivating the determining of the fault of the perception module depending on the surroundings of the vehicle.

* * * * *